Oct. 23, 1945.    W. T. MURDEN    2,387,602
THRUST BEARING AND MOUNTING THEREFOR
Filed March 16, 1942

INVENTOR
WILLIAM T. MURDEN
BY
Romeyn A. Spare
HIS ATTORNEY

Patented Oct. 23, 1945

2,387,602

UNITED STATES PATENT OFFICE 2,387,602

THRUST BEARING AND MOUNTING THEREFOR

William T. Murden, Bristol, Conn., assignor to General Motors Corporation, Detroit, Mich., a corporation of Delaware Application March 16, 1942, Serial No. 434,927

5 Claims. (Cl. 308—187)

This invention relates to bearings and their mountings and particularly to an antifriction thrust bearing and mounting which may form part of a clutch release mechanism.

An object is to provide an improved unit-handling thrust bearing and mounting of simplified structure. A further object is to provide a thrust bearing and mounting having an improved means for distributing and retaining a lubricant.

To these ends and also to improve generally upon devices of the character indicated, the invention consists in the various matters hereinafter described and claimed.

Figure 1:
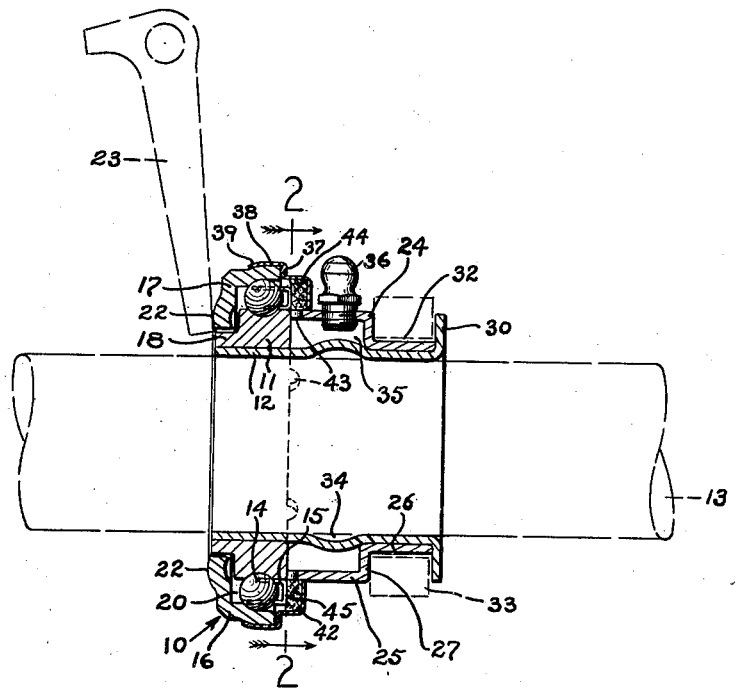
Figure 1 is a diametrical section through my invention.
Figures 2, 3:
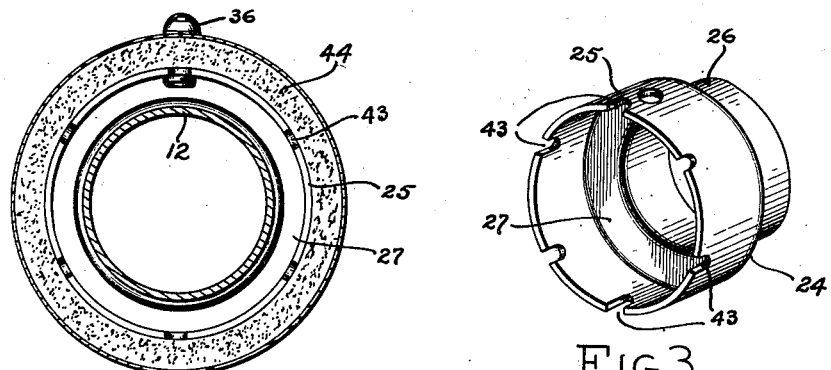
Figure 2 is a cross section taken along the line 2—2 of Fig. 1 and looking in the direction of the arrows.
Figure 3 is a perspective view of the thrust sleeve.

An antifriction thrust bearing, herein illustrated as a unit-handling clutch release bearing 10, has an inner race ring 11 tightly pressed over the forward end of a tubular shell 12 for unit-handling relation therewith, and this shell is mounted for axially slidable movement on a suitable supporting shaft 13. The inner race ring 11 is provided with a peripheral raceway in which roll a row of balls 14 annularly spaced by a separator 15, and these balls also roll in an annular raceway in an outer race ring 16 to provide for antifrictional and coaxial rotation of these race rings relative to each other. The outer race ring 16, which is generally cup-shaped, has an annular wall 17 extending radially inwardly into closely spaced relation with an annular stepped end portion 18 of the inner race ring 11 to substantially close the forward end of the ball chamber 20 against the ingress of deleterious matter and against the egress of lubricant. The annular portion of the wall 17 which lies within the annular stepped end portion 18 is dished axially outwardly from the inner race ring 11 to provide a substantially toroidal surface 22 that may be brought into engagement with the inner ends of suitable pivotally mounted clutch-operating fingers, one of which is shown at 23.

A stepped thrust sleeve 24, which may be formed from sheet metal, has an enlarged cylindrical sleeve portion 25 at its forward end and a reduced cylindrical sleeve portion 26 at its rearward end, these cylindrical sleeve portions being connected to an intermediate substantially radially disposed annular wall 27. The sleeve portion 25, which surrounds the tubular shell 12 in annularly spaced relation, abuts at its forward end against the race ring 11 to transmit thrust to this race ring; and the reduced cylindrical sleeve portion 26, which snugly fits over the tubular shell 12, abuts at its rearward end against an annular flange 30 bent substantially radially outwardly from the rearward end of the tubular shell 12 which may be composed of suitable sheet metal. The annular wall 27, sleeve portion 26, and the flange 30 co-operatively form a peripheral channel 32 arranged to loosely receive a suitable control member such as a yoke 33 which may be moved longitudinally of the shaft 13 to slide the tubular shell 12 on the shaft and shift the thrust bearing 10 into and out of operative engagement with the clutch operating fingers 23. To facilitate a free sliding movement of this tubular shell, a portion of the shell between the annular wall 27 and the inner race ring 11 is peripherally bulged outwardly away from the shaft 13 to provide an annular lubricant pocket 34 opening onto the shaft and which may be filled with a suitable grease before the tubular shell 12 is mounted on the shaft 13. The enlarged sleeve portion 25 is annularly spaced about the tubular shell 12 to provide an annular lubricant supply chamber 35 which may be filled with a suitable lubricant through a fitting 36 threaded through the sleeve portion 25. The annular side walls of the lubricant chamber are formed by the end surface of the inner race ring and by the wall 27.

The end of the ball chamber 20 adjacent to the lubricant chamber 35 is closed by a sealing device in unit-handling relation with the bearing 10. This sealing device serves the dual feature of maintaining lubricant within the ball chamber and of slowly feeding and filtering small additional amounts of lubricant from the supply chamber 35 into the ball chamber whenever there is a relative rotation between the race rings. A ring-shaped sheet metal casing, provided with an annular shoulder 37 engaging the rearward end face of the outer race ring 16, has an enlarged annular portion 38 peripherally embracing the outer race ring and having a rim 39 bent radially inwardly to matingly fit against a reduced portion of the outer race ring periphery. This metal casing also has a generally cup-shaped portion 42 projecting outwardly from the shoulder 37 in spaced overlying relation with the forward end of the thrust sleeve portion 25. The forward end of the cylindrical sleeve portion 25 is transversely cut through by a plurality of peripherally spaced slots 43 that extend in width from the inner race ring 11 through a portion of the width of the cup-shaped portion 42. A felt or other suitable lubricant-pervious sealing washer 44, which fits within the cup-shaped portion 42 and wipingly and sealingly engages the smooth periphery of the cylindrical portion 26, overlaps and closes the outer ends of the slots 43 so that lubricant emerging from these slots may only enter the sealing washer 44. This sealing washer is constructed with such a permeability that when saturated with lubricant it will prevent the free flow of lubricant therethrough. The ball separator 15 has a flat annular face 45 laterally engaging the washer 44. Whenever there is a relative rotation of the race rings 11 and 16, the separator face 45 will wipe a small amount of lubricant from the sealing washer to replenish and rejuvinate the lubricant in the ball chamber, and the amount of lubricant withdrawn from the felt washer 44 will be dependent upon the rate of separator rotation which is determined by the relative rate of rotation of the race rings. The sealing washer will also serve as a filter which prevents the entrance of dust, dirt and other deleterious matter into the ball chamber.

I claim:

1. In a device of the character indicated, an antifriction bearing having a pair of annularly spaced inner and outer race rings, a tubular member projecting from said inner race ring, a sleeve mounted on the tubuluar member and having a cylindrical portion annularly spaced about the tubular member adjacent to said inner race ring, said cylindrical portion having a lubricant passage therethrough, and a lubricant absorbing sealing ring carried by the outer race ring in rotatable sealing engagement with said cylindrical portion and overlying one end of said lubricant passage.

2. In a device of the character indicated, an antifriction bearing having annularly spaced inner and outer race rings, a tubular member secured in and axially projecting from said inner race ring, a stepped sleeve mounted on the tubular member, an enlarged cylindrical portion on one end of said sleeve in abutting engagement with said inner race ring and co-operating with said tubular member to provide an annular lubricant chamber adjacent to the inner race ring, said sleeve having a lubricant passage therethrough adjacent to said inner race ring, and a lubricant-pervious sealing ring carried by the outer race ring and sealingly engaging the sleeve in overlapping relation to said lubricant passage.

3. In a device of the character indicated, an antifriction bearing having a pair of relatively rotatable annularly spaced race rings, rolling elements in said space and in rolling contact with said race rings, a separator rotated by the rolling elements relative to said race rings, a seal including a lubricant-pervious sealing ring closing one end of the space between said race rings, said sealing ring filtering lubricant passing therethrough, means outside of said race rings for supplying lubricant to the inner periphery of the sealing ring, and an annular face on the separator alongside of and in wiping contact with said sealing ring to remove lubricant therefrom.

4. In a clutch release bearing having opposed race rings with rolling elements therebetween which are spaced apart by a separator, a lubricant permeable washer carried by one of the race rings and having annular rubbing contact at one side with the separator, the washer projecting beyond the end of the other race ring, and a lubricant containing chamber alongside of said other race ring and communicating with the inner periphery of said washer to supply lubricant thereto as the separator wipes the lubricant away from the side of the washer.

5. In a clutch release bearing having inner and outer race rings and rolling elements therebetween, a shell fitting within the inner race ring to form a slidable support therefor, the shell extending axially beyond one end of the inner race ring, a thrust sleeve surrounding the shell and abutting against the end surface of the inner race ring, the shell and the sleeve forming the inner and outer peripheral walls of a lubricant chamber, the thrust sleeve having a substantially radial supporting wall engaging the shell and spaced from the end surface of the inner race ring to form therewith the annular sides of the lubricant chamber, the thrust sleeve having an opening adjacent to the inner race ring to deliver lubricant outwardly, and a lubricant permeable washer carried by the outer race ring in projecting relation to the inner race ring and surrounding the thust sleeve at the opening.

WILLIAM T. MURDEN.